United States Patent
Voss

(10) Patent No.: US 8,893,745 B2
(45) Date of Patent: Nov. 25, 2014

(54) PRESSURE RELIEF VALVE WITH A POPPET VALVE SEAL

(76) Inventor: Wolfgang Voss, Schwerte (DE)

(*) Notice: Subject to any disclaimer, the term of this patent is extended or adjusted under 35 U.S.C. 154(b) by 780 days.

(21) Appl. No.: 13/013,864

(22) Filed: Jan. 26, 2011

(65) Prior Publication Data

US 2011/0180164 A1 Jul. 28, 2011

(30) Foreign Application Priority Data

Jan. 28, 2010 (DE) .................. 10 2010 006 223

(51) Int. Cl.
*F16K 17/06* (2006.01)
*F16K 17/04* (2006.01)

(52) U.S. Cl.
CPC ............. *F16K 17/046* (2013.01); *F16K 17/065* (2013.01)
USPC ............................ 137/494; 137/540; 251/282

(58) Field of Classification Search
USPC ......... 137/329.04, 494, 540, 543.23; 251/282
See application file for complete search history.

(56) References Cited

U.S. PATENT DOCUMENTS

| | | | | |
|---|---|---|---|---|
| 364,842 | A | * | 6/1887 | Morrin ................... 137/329.04 |
| 1,631,142 | A | * | 6/1927 | Masters ......................... 137/540 |
| 1,957,998 | A | * | 5/1934 | Finefrock et al. ........ 137/329.04 |
| 1,998,056 | A | * | 4/1935 | Naatz et al. .............. 137/543.23 |
| 2,326,462 | A | * | 8/1943 | Johnson ....................... 137/494 |
| 3,756,558 | A | * | 9/1973 | Okui ............................. 251/282 |
| 4,074,695 | A | * | 2/1978 | Weirich et al. ........... 137/543.23 |
| 4,312,376 | A | * | 1/1982 | Allen ............................ 137/494 |
| 4,936,714 | A | * | 6/1990 | Demircan .................... 137/494 |
| 5,927,323 | A | * | 7/1999 | Kikuchi et al. .............. 137/540 |
| 6,886,586 | B2 | * | 5/2005 | Fleury, Jr. ................ 137/329.04 |
| 7,331,361 | B2 | * | 2/2008 | Voss ............................. 137/540 |
| 2002/0148508 | A1 | * | 10/2002 | Ittlinger et al. .............. 137/540 |

* cited by examiner

Primary Examiner — John Rivell
(74) Attorney, Agent, or Firm — James Creighton Wray

(57) ABSTRACT

A pressure relief valve 1 having small dimensions and generating a high flow rate comprises an annular channel 15 between the pressure medium inlet 7 and the pressure medium outlet 8, the channel acting on a sealing cone 17 made of a special plastic material at the upper end of the closing unit 17 in case of pressure peaks such that the same is lifted out of the sealing seat 12 against the force of the valve spring 6. An embodiment is also possible in which the corresponding sealing rings 76, 80 must be passed over. The inner bore 9 of the pressure relief valve 1 has a stepped wall 21, so that a differential pressure relieving the valve spring 6 is generated.

14 Claims, 6 Drawing Sheets

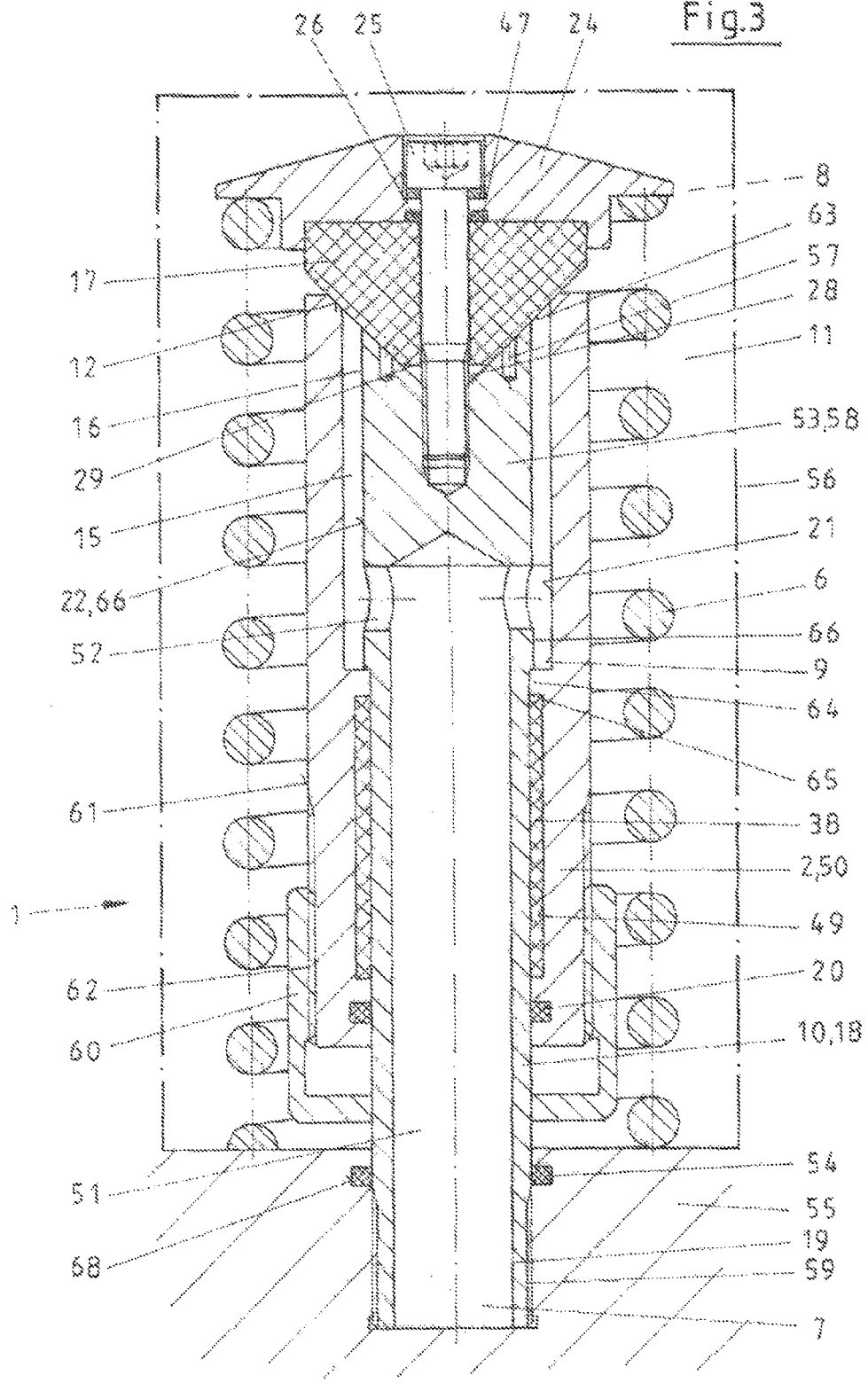

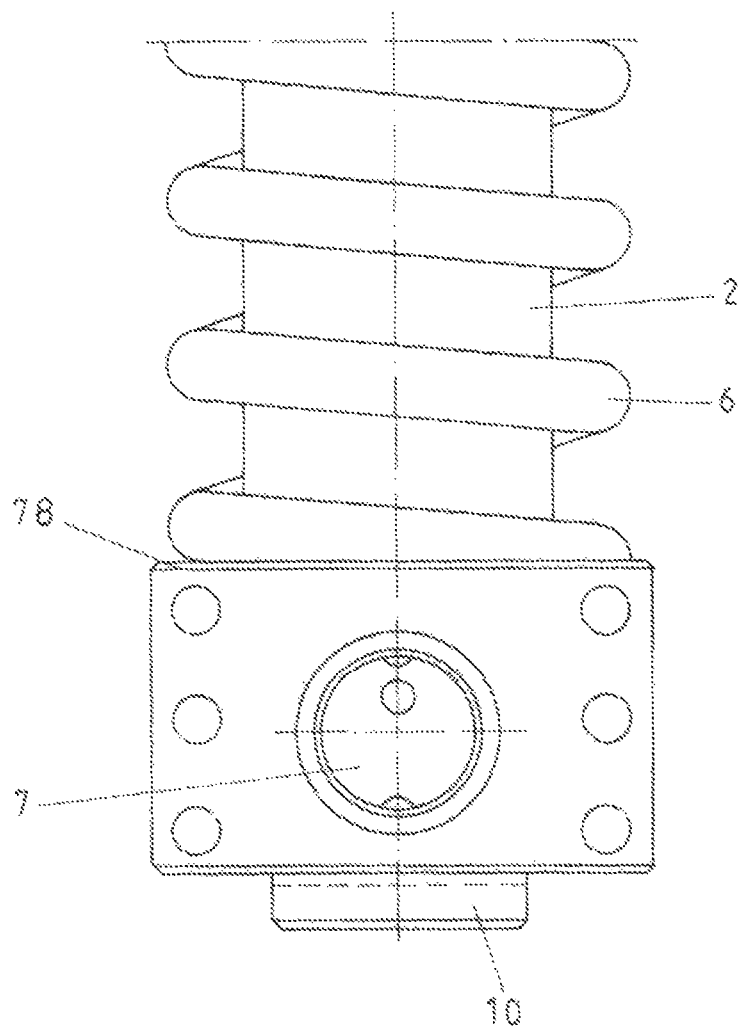

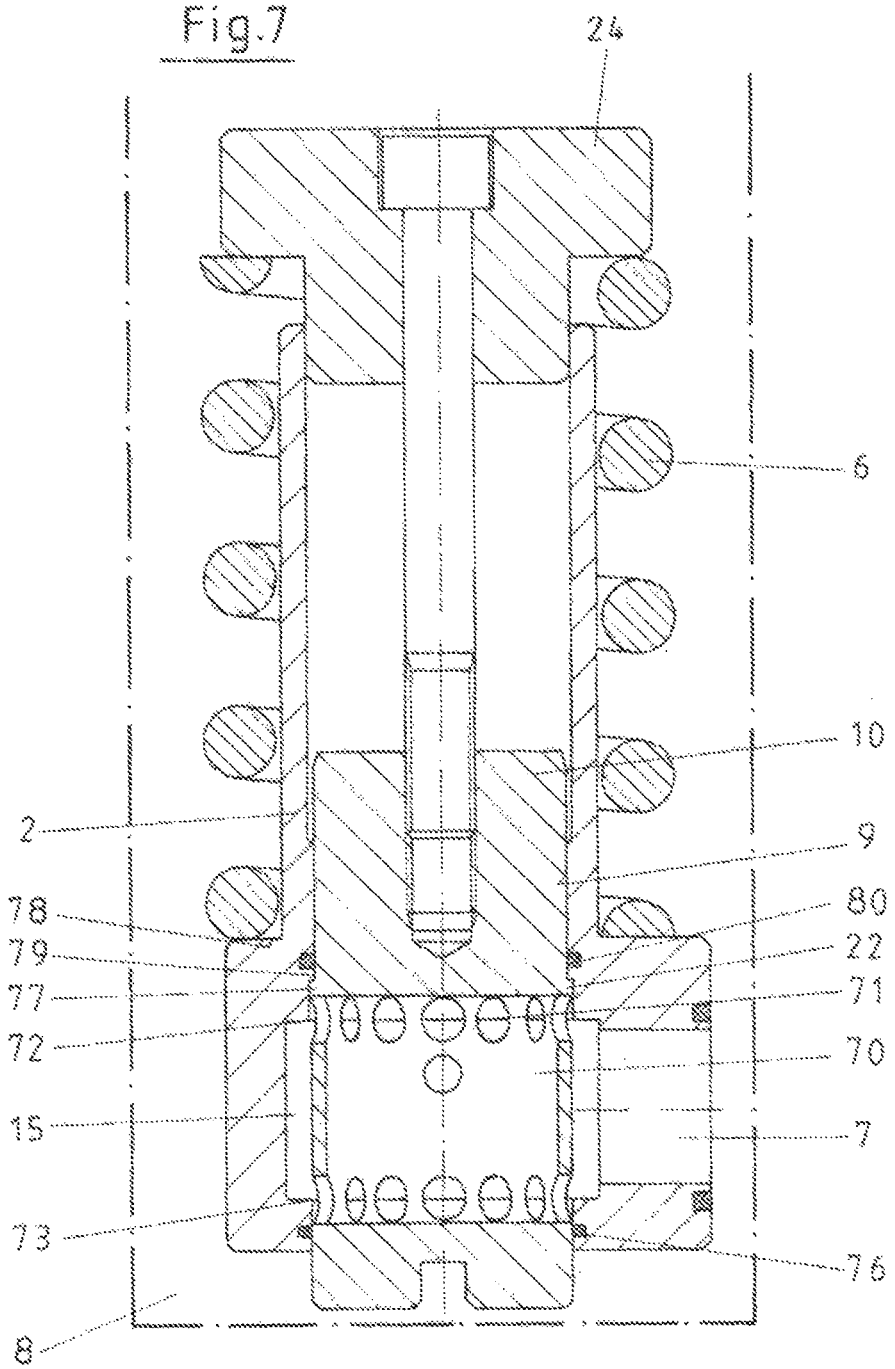

PRESSURE RELIEF VALVE WITH A POPPET VALVE SEAL

This application claims the benefit of German Application Ser. No. 10 2010 006 223.5 filed Jan. 28, 2010, which is hereby incorporated by reference in its entirety as if fully set forth herein.

The invention relates to a pressure relief valve for use in hydraulic, oil-in-water and water assembly, in particular for hydraulic props used at a pressure above 400 bar in underground mining and tunnel construction, comprising a closing unit arranged displaceably between the pressure medium inlet and pressure medium outlet against the force of an adjustable valve spring, the closing unit at normal pressure being kept in a sealing position by the valve spring.

Such pressure relief valves are used in a wide variety of industrial fields in order to avoid or rapidly relieve pressure peaks in the hydraulic system. They are used in underground mining and tunnel construction for the protection of the hydraulic face support, or of the individual props (DE 35 08 986 A1). These pressure relief valves are inserted in the hydraulic circuit and/or oil-in-water circuit such that in case of sudden overload, for example due to rock burst or due to other collapses of the hanging wall, they release the pressure medium available in the props such that no hazardous overpressure occurs in the hydraulic or oil-in-water assembly and/or is very rapidly relieved. These pressure relief valves have been very successfully applied in underground longwall mining. Owing to increasingly complicated systems, the pressure relief valves also have to be adapted to these special conditions and mainly ensure high flow rates. Pressure damping chambers are used to counteract the influence of other valves or other devices, as is known from DE 102 27 976 A1. In these pressure relief valves, the pressure medium is introduced into the hydraulic or oil-in-water or water system by the pressure medium supply line arranged in the lower part of the pressure relief valve, wherein the pressure medium is present against an adjustable valve spring and allows the flow of the pressure medium either to lateral outlets or to pressure medium outlets arranged in the axial direction of the valve. Owing to the connections and bores inside such pressure relief valves, the maximum flow rate that can be achieved is, however, limited.

It is therefore the object of the invention to create a pressure relief valve for flow rates of 10,000 and more $m^3$/min, which allows high pressures and operates safely and optimally has small dimensions.

According to the present invention, this object is achieved in that an annular channel sealed with respect to the pressure medium outlet by means of the closing unit is formed between the pressure medium inlet and pressure medium outlet, wherein the closing unit is acted on in case of pressure peaks such that it can be moved against the force of the valve spring into the open position, and that the valve shaft and/or the inner bore receiving it is configured to generate a differential contact pressure relieving the valve spring.

In a pressure relief valve configured in such a way, the annular channel, which connects the pressure medium inlet and the pressure medium outlet, ensures that a sufficiently large amount of pressure fluid can pass when the valve is opened. The closing unit ensures that this pressure medium present in the annular channel can flow in the direction of the pressure medium outlet in case of pressure peaks, wherein the valve spring relevant for the adjustment to the pressure peaks can be configured in a relatively simple and advantageous manner because a differential contact pressure can form for this purpose in the area of the valve shaft. The valve shaft and/or the valve housing are designed accordingly.

According to a practical embodiment of the invention, the pressure medium inlet transitions into the annular channel, which leads up to the spring chamber and is recessed in the valve shaft and/or in the wall of the valve housing, the top of the valve piston configured as a closing unit is provided with a sealing cone made of a reversible plastic material having high indentation hardness, and the inner bore receiving the valve shaft has a stepped wall in the area of the sealing seat for the sealing cone and a wall slinger washer provided at the lower end of the inner bore. In case of pressure peaks, the oil-in-water emulsion acts on the valve piston with the specially configured sealing cone such that the sealing cone is pressed out of the sealing seat, wherein correspondingly large amounts of pressure medium flowing in from the ring channel can flow into the spring chamber along the sealing cone and along the sealing seat and can flow out from there to the pressure medium outlet. Once the pressure has been relieved, the valve closes again as the sealing cone moves into the sealing seat via the valve spring and seals the area. Owing to the fact that the wall of the inner bore is configured in a stepped manner, more 'specifically such that a differential contact pressure is generated, relatively small and simple weak valve springs can be used so that the entire pressure relief valve can advantageously be implemented with compact dimensions. Owing to this skillful design of the pressure relief valve, the lateral pressure medium inlet can, for example, be a DN32. which in turn provides the possibility of discharging not only large flow rates in short periods of time, but also of including the pressure relief valve directly in the control mechanism, for example associating it with a control valve. Effective protection of the expensive control unit can thus be realized at relatively low expenditure. Apart from the possibility of generating the differential contact pressure by means of the stepped wall of the inner bore, it is also possible for the valve shaft to have a stepped outer wall and the inner wall to be configured smooth throughout. The valve spring is advantageously configured as a cylindrical spring that is adapted to the inner bore designed as a differential inner bore. Such a cylindrical spring is very sensitive and ensures uniform and timely movements of the valve piston in all situations.

It has already been mentioned that the sealing cone is advantageously made of a reversible plastic material having high indentation hardness. A sealing cone configured in such a manner can advantageously also be connected to the actual valve piston, with the provision that the sealing cone made of special POM or PET plastic material is connected detachably to the valve shaft, preferably by means of a countersunk screw that also captures the spring plate, and has an indentation hardness of 50-160 $N/mm^2$. Consequently, the plastic material need not absorb the entire pressure of the countersunk screw, but instead this pressure is also absorbed by spring plates made of metal, yet an effective unit can thus be formed, and this can in turn ensure that the sealing cone fits exactly into the provided sealing surfaces and thereby achieves complete sealing. The special plastic material is, for example, also sold under the supplementary name polyacetal and is described as a highly crystalline, thermoplastic material having high strength and rigidity as well as good properties and wear resistance with low absorption of moisture. Moreover, it has good dimensional stability and especially good fatigue strength as well as excellent tensibility, so that it is excellently suited for the use provided in this description.

In order to shape the sealing seat and sealing cone so as to achieve especially advantageous sealing properties and in order to ensure a stable unit between the sealing cone and the valve shaft, according to the invention the tip of the sealing cone that can be introduced in a funnel bore at the top of the valve shaft is configured as a truncated cone. As a result of the special shape of the tip of the sealing cone, the detachment of the sealing cone is facilitated if necessary, and the surface of the sealing cone acted on by the pressure medium is restricted to required magnitude.

The sealing ring associated with the countersunk screw as well as the sealing ring designated as a rectangular sealing ring have a special shape and comprise a special material. For this purpose, according to the invention a rectangular sealing ring made of PTFE is arranged at the lower end of the valve shaft and pressed against the wall slinger washer by means of a ring screw having a circumferential tip. It is thus prevented that the pressure medium moves outward from the pressure medium supply line via the inner bore and gets into the atmosphere at the lower end of the pressure relief valve. The PTFE ring and/or the rectangular sealing ring can be effectively fixed and at the same time placed in the optimum sealing position by means of the ring screw, in particular because it is equipped with the circumferential tip, which ensures pressing against the valve piston. The wall slinger washer forms the brace for the ring screw and is also used to generate the differential contact pressure, as will be described below.

The differential contact pressure in a desired range is in particular generated and ensured by the fact that the wall slinger washer of the inner bore also determining the differential contact pressure has an inside diameter of 39 mm and the further determining wall just before the sealing seat has an inside diameter of 40 mm. The differential contact pressure created in this way in particular provides the possibility of getting by with relatively small and weak valve springs, which in turn makes it possible to reduce the dimensions.

The ring screw with the underside and/or the correspondingly stepped inner bore form the travel stop used as spring retention and configured as a lid. The lid, which has a larger diameter, advances against the travel stop and thus provides blocking protection for the valve spring, releases the required opening cross section and at the same time ensures that the sealing cone moves back into the sealing seat in the shortest possible time once the pressure peak has been overcome.

The valve shaft can have the optimum length for the function thereof if, according to the present invention, a guide sleeve is associated with the valve shaft and arranged between the wall slinger washer and the front part of the pressure medium inlet in a longitudinally grooved ring, enveloping the valve shaft. This guide sleeve surrounds the valve shaft and guides it over a certain length, so that it can be displaced in a smoothly gliding manner from the sealing position into the open position and vice versa.

The force of the valve spring can easily be adjusted according to the respective conditions if, according to the present invention, the valve housing parts and the valve spring are screwed to one another with tension. In this way, the adjustment of the valve spring is possible from the outside with little effort, and it can theoretically be provided that both parts of the housing, or one, is configured rectangular in order to be able to apply an auxiliary wrench.

In the embodiment described so far, the valve spring is subjected to stress when the valve is activated because the valve piston is moved into the spring chamber against the force of the valve spring. In this case, the pressure medium inlet is provided laterally. If such an arrangement of the pressure medium inlet is not possible, or a shorter embodiment of the entire valve housing is, for example, desired for other reasons, it is advantageous if the valve housing is configured as a closing unit that can be displaced on the valve piston against the force of the valve spring, and if the pressure medium inlet is configured as a blind hole in the valve piston, wherein the blind hole extends to the upper end and is [sic] to the annular channel by means of radial bores. This embodiment is mainly different in that it is not the valve piston that is influenced by the pressure medium, but rather the valve housing, which in this case is arranged displaceably on the valve piston and influences the valve spring surrounding the valve housing, so that in this embodiment the "weak" valve spring is uniformly compressed on activation. The valve spring ensures that the valve housing is again pressed back into the sealing seat when the pressure subsides. The valve spring surrounding the valve housing is in turn covered by a protective housing in whose bottom the valve piston is fixed.

It is particularly advantageous to provide the design of the wall generating the differential contact pressure such that the stepped outer wall and/or stepped wall of the inner bore is configured between the sealing seat for the upper sealing ring and a rectangular sealing ring arranged at the lower end of the valve shaft.

In order to be able to adjust the valve spring quickly and easily, the valve piston can be fixed on the bottom of a protective housing surrounding the valve housing, has auxiliary bores in the piston head and is connected to the spring plate by means of a countersunk screw. The spring is normally adjusted during the assembly of the valve so that the valve piston can be fixed in the bottom before the sealing cone is attached to the piston head and screwed on. The valve housing itself can then be displaced on the valve piston, wherein the valve spring is arranged and coupled to the valve housing such that it can ensure that the valve housing is again pressed into the sealing seat once the pressure has subsided.

The opening width released by the valve housing can be exactly adjusted and predefined in that a spacer cap is associated with the valve housing and is designed and arranged so as to be displaceable on the outer wall of the housing and define the width of the opening gap at the sealing seat at 2-10 mm. For this purpose, the valve housing as well as the spacer part and/or the spacer cap have corresponding threads, so that the opening gap can be exactly adjusted with little effort.

Another variant of a corresponding valve having differential contact pressure generation is one, in which the valve piston has an axial blind hole connected to the pressure medium inlet and a plurality of radial bores configured in the upper and lower end regions of the valve piston and arranged in two planes, an annular channel connecting the planes and the pressure medium inlet is configured in the valve housing, and the valve piston has a stepped outer wall generating differential contact pressure that relieves the valve spring, wherein the larger insider diameter is associated with the lower plane of the radial bores with sealing ring. When a pressure peak occurs, it is thus ensured by the special formation of the differential contact pressure that the valve piston slides out of the valve housing, so that now the pressure fluid can flow out into the protective housing and from there to the environment without putting anyone at risk. Again, the pressure medium inlet is arranged laterally, so that the pressure medium can rapidly propagate over the annular channel and act on the valve piston. If the valve piston is fixed, the valve housing is displaced thereon upward or, as already mentioned, the piston is displaced downward out of the valve housing, depending on which mode of operation is desired.

Displacing the valve piston out of the valve housing is further ensured by providing the valve piston with an expanded outer wall predetermining an insertion end ring above the upper plane of the radial bores, the insertion end ring having a larger outside diameter than the inner bore. The valve piston is thus blocked in this direction and can move uniformly and safely, favored by the predetermined differential contact pressure.

It is advantageous for the adjustment of the valve spring as well as for the optimum operation of the valve if the valve spring is arranged between the valve housing and the valve piston and clamped between the spring plate and the valve housing. As the pressure medium inlet is disposed at a right angle to the annular channel or the inner bore in the valve piston, it forms a stable brace for the valve spring, which can be supported on the valve plate at the opposite end.

While according to the above-described embodiment the valve spring is arranged inside the valve housing, according to another embodiment of the invention the valve spring is arranged outside the valve housing enveloping it and clamped to the valve housing between the spring plate, which is likewise arranged outside the valve housing, and an annular protrusion. Another design variant is thus created, wherein the spring is adequately secured by the protective housing, but otherwise, in the case described herein, does not constitute a hazard for the work force.

While an embodiment is described above in which the insertion ring is configured directly at the end of the annular channel, it is also possible to place it further in the area of the wall of the valve housing, which is achieved according to the present invention in that the insertion end ring can be introduced in the inner bore and is configured to be supported against a housing edge just before the upper sealing ring. This embodiment also ensures that the valve piston cannot move into the spring chamber and/or into the inner bore when pressurized, but only in the opposite direction, which, as already mentioned, is definitely further favored by the fact that a stepped inner bore has been predetermined.

The invention is particularly characterized in that the proposed pressure relief valve has a very small size and thus can in particular be used very well in the field of control units. Moreover, it is design such that using relatively simple, small valve springs, large amounts of pressure medium can be discharged once the valve has been activated, and the amounts can flow out through the pressure relief valve into the atmosphere through the in turn correspondingly large-sized outflow paths. The pressure medium safely flows through the pressure relief valve via the radial bore and the special dimensions thereof toward the sealing cone of the valve piston and lifts the same out of the sealing seat. The valve spring can be quickly and exactly adjusted because the valve housing is configured in two pieces, or other possible design possibilities and embodiments have been created for the valve housing, and because it is possible to use the previously mentioned smaller sized and/or simpler valve springs. It is also possible to arrange the valve housing displaceably on the valve piston and to specify by means of the valve spring at which pressure and under what circumstances the valve is activated and the displacing valve housing releases an adequately large opening gap.

Further details and advantages of the subject matter of the present invention will be apparent from the following description of the corresponding drawings, which illustrate a preferred embodiment, including the necessary details and individual parts. The drawing shows:

DETAILED DESCRIPTION OF THE PREFERRED EMBODIMENTS

Figure 1:
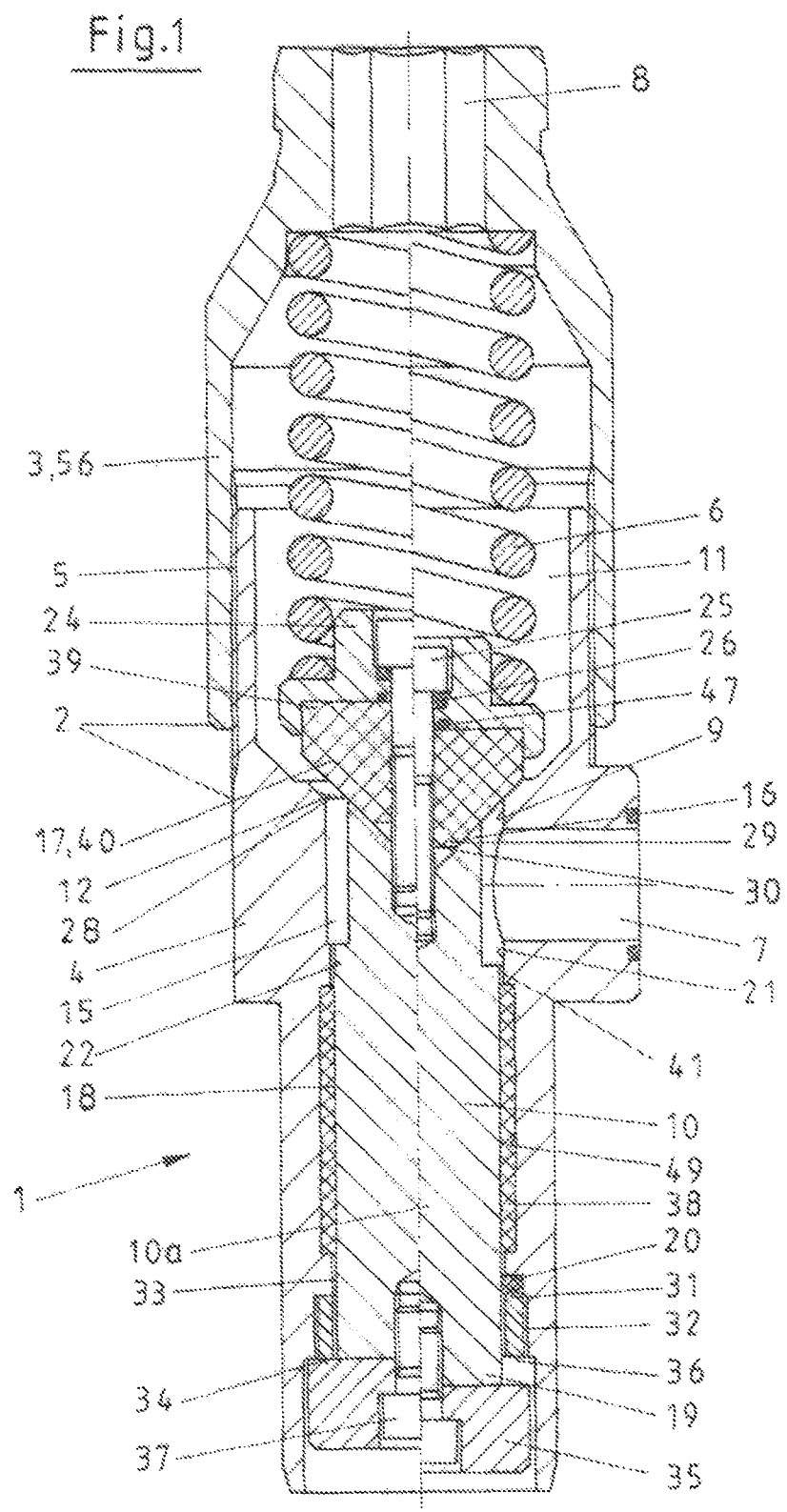
FIG. 1 a longitudinal section of the pressure relief valve in a closed position on the right side and in an open position on the left side, FIG. 2 a lateral view of the pressure relief valve, FIG. 3 a longitudinal section of the pressure relief valve comprising a movable valve housing, FIG. 4 a view of the lower area of the housing of the sectional view of the valve shown in FIG. 5, FIG. 5 a sectional view of the valve according to FIG. 1 with the generation of differential contact pressure in the area of the annular channel, FIG. 6 the valve according to FIG. 5 comprising a valve spring outside the valve housing and FIG. 7 a sectional of the valve shown in FIG. 6.

FIG. 1 is a cross-section of the pressure relief valve 1 clearly showing that the valve housing 2 is composed of two valve housing parts 3 and 4. Both valve housing parts 3, 4 can be displaced with respect to one another by means of a thread 5, so that the valve spring 6 arranged in the spring chamber 11 can be accordingly tensioned when both valve housing parts 3, 4 are rotated with respect to one another. The valve spring 6 in the spring chamber 11 presses onto the valve piston 10*a*, so that it is tightly arranged in the sealing seat 12 such that the pressure fluid and/or pressure medium at "normal pressure" cannot leave the area between the pressure medium inlet 7 and the sealing seat 12.

The pressure medium is conducted into the annular channel 15 through the pressure medium inlet 15, the annular channel being arranged and configured such that the pressure medium can optimally act on the valve piston 10 and/or the sealing cone 17 thereof. The valve spring 6 is adjusted such that the valve piston 10*a* and/or the sealing cone 17 cannot lift out of the sealing seat 12 at normal pressure. Only when the pressure of the pressure medium is increased due to rock burst or similar overload is the valve piston 10*a* and/or the sealing cone 17 thereof displaced in the inner bore 9 such that an all-around gap is created between the sealing seat 12 and the sealing cone 17 through which the pressure medium can flow out in the direction of the pressure medium outlet 8. If the pressure drops again, the valve spring 6 ensures that the valve closes again, which is to say that the sealing cone 17 enters the sealing seat 12 and provides complete sealing there.

This sealing cone 17 is made of a special plastic material, more specifically a reversible plastic material having high indentation hardness, in this case polyacetal (POM) or a similar POM plastic material or PET. In this context, the high indentation hardness and rigidity is important, as are the good gliding properties and wear resistance with low moisture absorption, as is provided by the plastic material designated as polyacetal.

The sealing cone 17 is connected to the valve shaft 18 by means of a countersunk screw 25, which is mounted in the spring plate 24. The spring plate 24 comprises the cylindrical part 39 of the sealing cone 17, while the truncated cone-shaped sealing part 40 is drawn into the funnel bore 28 of the valve shaft 18, wherein the tip 29 has the shape of a truncated cone 30 in order to avoid unnecessary sticking of the sealing cone 18 in the funnel bore 28.

The annular channel 15 is configured in the embodiment shown in FIG. 1 such that it reduces the diameter of the valve piston 10*a* and/or that of the valve shaft in this area. It has the same dimension all the way around and thus forms an optimum outflow channel for the pressure medium and/or pressure fluid flowing in via the pressure medium inlet 7.

A square sealing ring 20 made of PTFE is arranged at the lower end 19 of the valve shaft 18 and is pressed against the wall slinger washer 33 and the outer wall 22 of the valve shaft 18 by means of the ring screw 32. This results in effective sealing, wherein the wall slinger washer 33 has an inside diameter of 39 mm, while the inner bore at the opposite end, which is to say at the top 16 of the valve shaft 18, has an inside diameter of 40 mm. This results in a stepped wall 21, and thus in a differential contact pressure, which allows the use of simpler valve springs 6.

The ring screw 32 for fixing the rectangular sealing ring 30 has a tip 21 in order to deliberately influence the sealing ring 20, and further an underside 34 against which the lid 35 of the valve shaft 18 and/or of the valve piston 10a rests, as is shown in the left half of the drawing. In this way, a consistently uniform opening is achieved when the valve piston 10a is moved out of the sealing seat 12 due to the pressure. This uniform cross-section of the opening allows and ensures a rapid discharge of the pressure fluid and discharge of the pressure fluid in a significant amount, wherein 10,000 m$^3$/min is indicated as the minimum volume. The lid 35 is used as a travel stop 36 in this case, wherein it is connected to the actual valve shaft 18 by means of a screw 37.

It should further be mentioned that the valve shaft 18 is surrounded by a guide sleeve 18, which extends from the wall slinger washer 33 to the front part 41 at the pressure medium inlet 7. The guide sleeve 33 is located in the longitudinally grooved ring 49. It ensures the uniform movement of the entire valve piston 10a in the inner bore 9 when the described overpressure occurs and prevents detrimental tilting.

Similarly to the rectangular sealing ring 20 at the lower end 19 of the valve shaft 18, a sealing ring 26 is also provided in the area of the head of the countersunk screw 25. This ring is also preferably provided with a square cross-section and arranged and pressurized such that the pressure medium cannot enter the spring chamber 11 along the shaft of the countersunk screw 25. In addition, a small sealing ring 47 is arranged such that no pressure medium can exit in the direction of the spring chamber 11 along the bottom of the spring plate 24.

Figure 2:
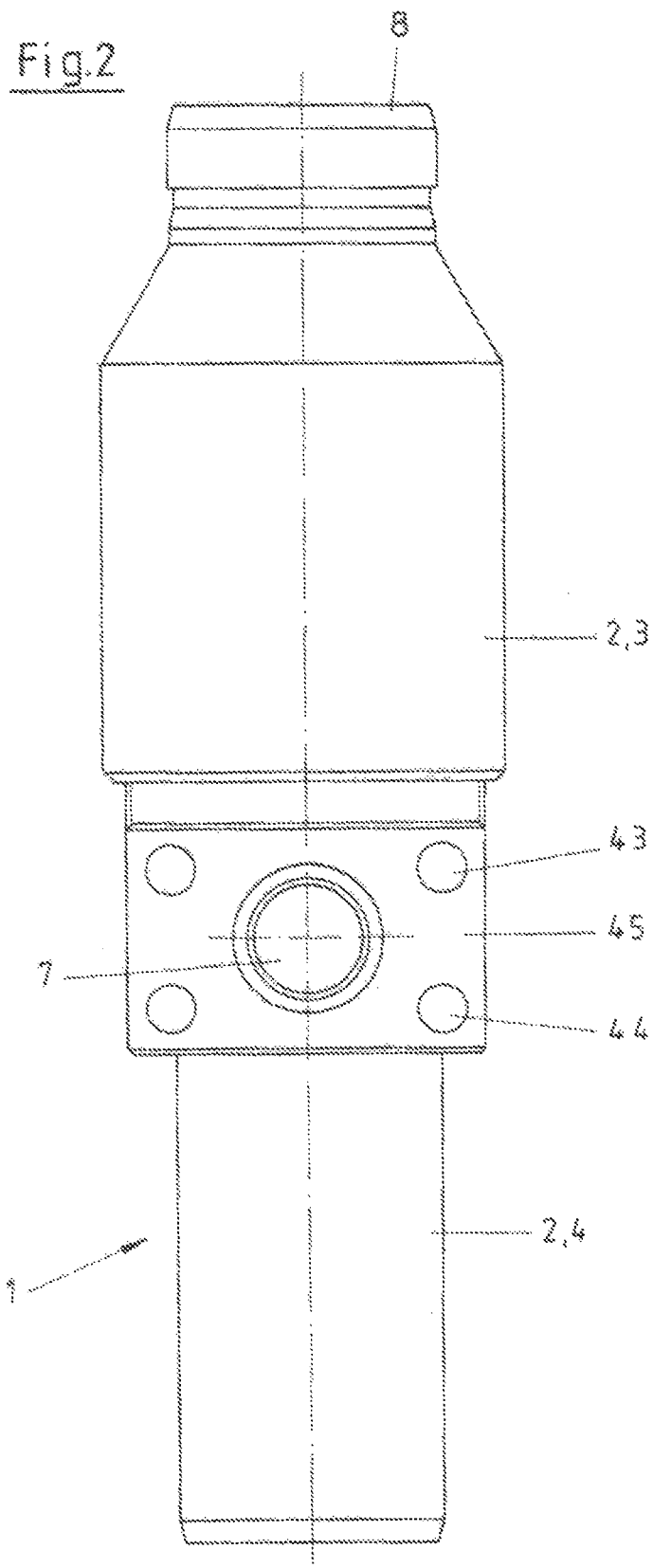

FIG. 2 is a lateral view of the pressure relief valve 1, showing clearly that the valve housing 2 is composed of the two valve housing parts 3, 4, which can be screwed with respect to one another. Fixation bores 43, 44, by means of which the pressure relief valve 1 can be fixed, for example, optimally in the housing in the area of a control unit, are provided in the area 45 of the pressure medium inlet 7.

It is possible to safely activate the pressure relief valve 1 and displace it against the force of the valve spring 6, which is relatively weak and small, and in this case, for example, produces 70 kg, because a differential contact pressure is created by the shape of the inner bore 9, by means of which the valve spring 6 is compressed. For this purpose, the sudden change in diameter is provided, which is created in the area of the wall slinger washer 33 and the wall 21 in the area of 10 the sealing seat 12. This sudden change in diameter and/or the differential contact pressure resulting therefrom ensures a uniform and sensitive course of the valve piston 10a, so that safe operation is possible when using the described and simple valve spring 6. The sudden change in diameter provides a significant increase in the contact pressure of the valve piston 10a and thus the use of such advantageous valve springs 6.

In terms of functionality, the pressure relief valve 1 shown in FIG. 3 in principle corresponds to the pressure relief valve shown in FIGS. 1 and 2. In FIG. 3, however, the pressure relief valve 7 is selected and arranged such that the pressure medium can enter the actual valve from the bottom 55. This has design and dimensional advantages, wherein the pressure medium enters through the blind hole 51 configured in the valve piston 10a, and enters the annular channel 15, and/or inner bore 9 through the radial bores 52 at the upper end 53 of the valve piston 10a. From there, the pressure medium acts on the valve and opens it, or leaves it in the closed state. Unlike the description in FIGS. 1 and 2, it is not the valve piston 10a that forms the closing unit in this case, but rather the valve housing 2, which is arranged displaceably on the rigid valve piston 10. The closing unit is designated with reference numeral 50. This valve piston 10a is screwed into the bottom 55 of the protective housing 56, both having a thread 59 for this purpose. Auxiliary bores 57 are provided at the piston head 58, so that prior to attaching the sealing cone 17, the valve piston 10a or valve shaft 18 thereof can be screwed correspondingly deep into the bottom 55. Prior to that, the sealing ring 54, which is likewise configured rectangular and made of PTFE, is inserted into the groove 68 at the bottom 55, so that it can ensure the required sealing in this area.

After screwing the valve piston 10a into the bottom 55, the sealing cone 17 is attached and fixed by means of the countersunk screw 25. This also fixes the spring plate 24, which forms the upper end of the valve piston 10a. The valve spring 6 is tensioned against this spring plate 24, the valve spring being connected at the lower end to the valve housing 2, which, as already mentioned, is used as the closing unit 50 in this case. All parts are surrounded by the protective housing 56, so that the valve spring 6 as such cannot represent a hazard. The pressure medium outlet 8, which is not shown here, is also arranged in this protective housing 56.

The valve housing 2 and/or the closing unit 50 have a spacer cap 60 in the bottom area comprising the rectangular sealing ring 20. This spacer cap 60 is connected to the outer housing wall 61 by means of a thread 62, so that by correspondingly actuating the spacer part 60 it can be predefined how far the valve housing 2 can move away from the sealing cone 17 in order to predetermine and/or release the opening gap 63. This opening gap 63 is located in the area of the sealing seat 12, wherein it should be dimensioned and/or predetermined by the position of the spacer part 60 at 4-6 mm.

The wall of the valve piston 10a is predetermined over the length of the same with different diameters, wherein the corresponding jump is provided in the area of the shoulder 64 and designated with 65 and 66. 65 has a diameter of 39 mm and 66 has a diameter of 40 mm.

Figure 5:
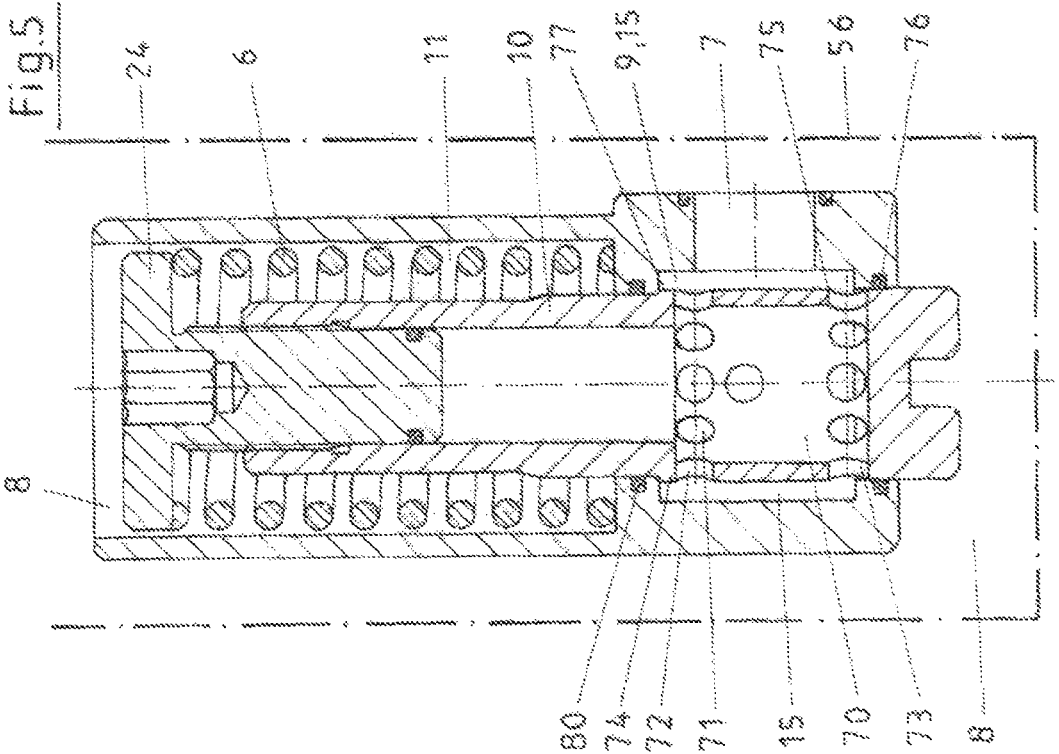
Figure 4:
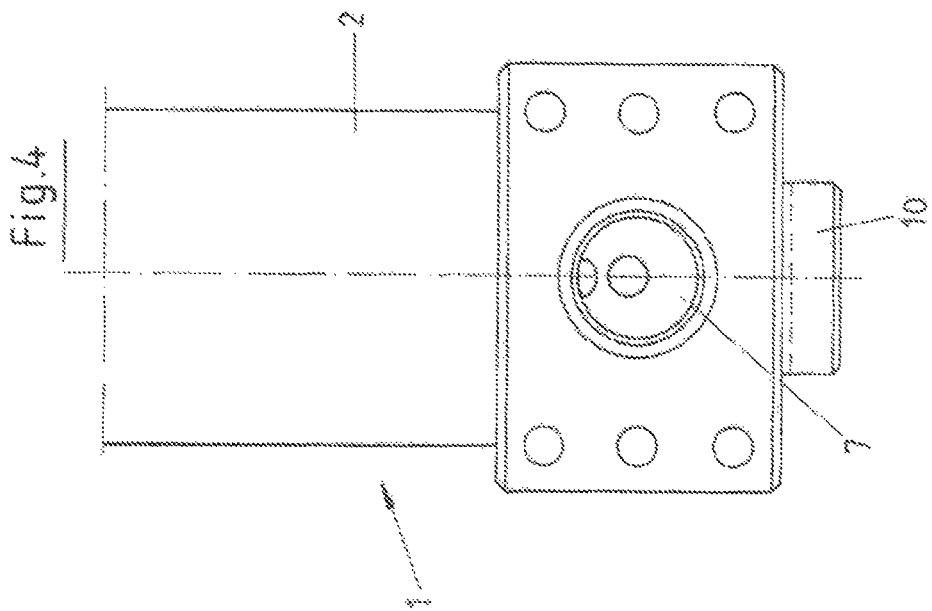

FIGS. 4 and 5 show a pressure relief valve in which an upper sealing ring 80 and a lower sealing ring 76 are provided on both sides of the pressure medium inlet, which ensure the required sealing. Moreover, a stepped inner wall is present both in the upper plane 72 and in the lower plane 73, which is to say above of the radial bores 71. The pressure medium flows out of the pressure medium inlet 7 into the annular channel 15 through this radial bore 71, wherein a kind of blind hole 70 is configured inside the valve piston 10a. If, in case of overpressure, the pressure medium flows into this blind hole 70 and/or into the annular channel 15, the valve piston 10a can only extend downward into the protective housing in the direction of the pressure medium outlet 8 because an insertion end ring 77 is configured at the valve piston in the upper end area 74. Because the diameter in the lower end area 75, as already mentioned, is larger than in the upper end area 74, the valve piston 10a can only move in the direction of the lower end area 75 any, so that the sealing ring 76 can be passed over and the pressure medium can flow out in the direction of the pressure medium outlet 8. The protective housing is designated with 56.

In the embodiment according to FIGS. 4 and 5 as well as according to that of FIGS. 6 and 7, the pressure relief valve 1 additionally comprises the above-mentioned protective housing 56. The valve piston 10a is the closing unit 10, while the valve housing 2 has no closing unit function. According to the embodiment of FIGS. 4 and 5, the valve spring 6 is arranged inside the valve housing 2, but according to the embodiment of FIGS. 6 and 7 it is arranged outside the valve housing 2. This becomes clear when looking at FIGS. 6 and 7. FIG. 7 shows a longitudinal section of the pressure relief valve 1 according to FIG. 6, wherein it becomes clear that here the pressure medium inlet 7 is also arranged laterally of the valve housing 2. Again, the valve piston has the blind hole 70 comprising the radial bores 71, so that the pressure medium can flow into the interior of the valve piston 10a, favored by the annular channel 15 configured in the valve housing 2. The insertion end ring 77 is placed a small distance inside the valve housing 2 here and is located in the inner bore just before the upper sealing ring 80. The valve spring 6 arranged outside the valve housing 2 is supported both on the spring plate 24 and on the annular protrusion 78 of the valve housing 2.

As already mentioned, the insertion end ring 77 is placed inside the inner bore, which, for this purpose, has a housing edge 79 against which this insertion end ring 77 can advance.

All the features that have been mentioned, including those solely disclosed in the drawings, are considered to be essential to the invention, both alone and in combination.

The invention claimed is:

1. A pressure relief valve for use in hydraulic, oil-in-water and water assemblies, in particular for hydraulic props used at a pressure above 400 bar in underground mining and tunnel construction, comprising a closing unit (10, 50), which is arranged displaceably between a pressure medium inlet (7) and a pressure medium outlet (8) against the force of an adjustable valve spring (6) and which at normal pressure is kept in a sealing position by means of the valve spring (6), characterized in that between the pressure medium inlet (7) and the pressure medium outlet (8) an annular channel (15) that is sealed by the closing unit (10, 50) with respect to the pressure medium outlet (8) is configured, wherein the closing unit (10, 50) is acted on in case of pressure peaks such that it can be moved into the open position against the force of the valve spring (6) and a valve shaft (18) and/or an inner bore (9) receiving it are configured to generate a differential pressure relieving the valve spring (6), and wherein a sealing cone (17) is detachably connected to the valve shaft (18) by means of a countersunk screw (25) that also captures a spring plate (24).

2. The pressure relief valve according to claim 1, characterized in that the pressure medium inlet (7) transitions into the annular channel (15), which leads up to a spring chamber (11) and is recessed in the valve shaft (18) and/or in a stepped wall (21) of a wall housing (2), the top (16) of a valve piston (10a) configured as the closing unit (10) is equipped with the sealing cone (17) made of a plastic material having high indentation hardness, and the inner bore (9) receiving the valve shaft (18) comprises a stepped wall (21) in the area of a sealing seat (12) for the sealing cone (17) and a wall slinger washer (33) that is provided at the lower end (19) of the inner bore (9).

3. The pressure relief valve according to claim 1, characterized in that the outer wall (22) of the valve shaft (18) has a stepped configuration.

4. The pressure relief valve according to claim 1, characterized in that the sealing cone (17) comprises a special POM or PET plastic material and has an indentation hardness of 50-160 N/mm².

5. The pressure relief valve according to claim 1, characterized in that the tip (29) of the sealing cone (17), which can be introduced in a funnel bore (28) at the head (16) of the valve shaft (18), is configured as a truncated cone.

6. A pressure relief valve according to claim 1, characterized in that a wall slinger washer (33) of the inner bore (9) also determining the differential pressure has an inside diameter of 39 mm and a further determining wall (21) has an inside diameter of 40 mm just before a sealing seat (12).

7. The pressure relief valve according to claim 1, characterized in that two or more valve housing parts (3, 4) are screwed to one another, tensioning the valve spring (6).

8. The pressure relief valve according to claim 1, characterized in that a valve housing (2) is configured as a closing unit (50) that can be displaced on a valve piston (10a) against the force of the valve spring (7), and the pressure medium inlet is configured as a blind hole (51) in the valve piston (10a), wherein the blind hole (51) extends to the upper end (53) and is connected to the annular channel (15) by means of one or more radial bores (52).

9. The pressure relief valve according to claim 1, characterized in that a valve piston (10a) can be fixed in the bottom (55) of a protective housing (56) surrounding a valve housing (2) by means of a thread (59), has auxiliary bores (57) in the piston head (58) and is connected to the spring plate (24) by means of the countersunk screw (25).

10. The pressure relief valve according to claim 1, characterized in that a spacer cap (60) is associated with the valve housi0ng (2), and is arranged displaceably on an outer housing wall (61) and predetermines the width of the opening gap (63) at the sealing seat (12) at 2-10 mm.

11. A pressure relief valve for use in hydraulic, oil-in-water and water assemblies, in particular for hydraulic props used at a pressure above 400 bar in underground mining and tunnel construction, comprising a closing unit (10, 50), which is arranged displaceably between a pressure medium inlet (7) and a pressure medium outlet (8) against the force of an adjustable valve spring (6) and which at normal pressure is kept in a sealing position by means of the valve spring (6), characterized in that between the pressure medium inlet (7) and the pressure medium outlet (8) an annular channel (15) that is sealed by the closing unit (10, 50) with respect to the pressure medium outlet (8) is configured, wherein the closing unit (10, 50) is acted on in case of pressure peaks such that it can be moved into the open position against the force of the valve spring (6) and a valve shaft (18) and/or an inner bore (9) receiving it are configured to generate a differential pressure relieving the valve spring (6), characterized in that a rectangular sealing ring (20) comprising PTFE is arranged at the lower end (19) of the valve shaft (18) and is pressed onto a wall slinger washer (33) by means of a ring screw (32) having a circumferential tip (31).

12. A pressure relief valve for use in hydraulic, oil-in-water and water assemblies, in particular for hydraulic props used at a pressure above 400 bar in underground mining and tunnel construction, comprising a closing unit (10, 50), which is arranged displaceably between a pressure medium inlet (7) and a pressure medium outlet (8) against the force of an adjustable valve spring (6) and which at normal pressure is kept in a sealing position by means of the valve spring (6), characterized in that between the pressure medium inlet (7) and the pressure medium outlet (8) an annular channel (15) that is sealed by the closing unit (10, 50) with respect to the pressure medium outlet (8) is configured, wherein the closing unit (10, 50) is acted on in case of pressure peaks such that it can be moved into the open position against the force of the valve spring (6) and a valve shaft (18) and/or an inner bore (9) receiving it are configured to generate a differential pressure relieving the valve spring (6), characterized in that a guide sleeve (38) is associated with the valve shaft (18) and arranged between a wall slinger washer (33) and the front part (41) of the pressure medium inlet (7) in a longitudinally grooved ring (49), enveloping the valve shaft (18).

13. The pressure relief valve according to claim 12, characterized in that the pressure medium inlet (7) transitions into the annular channel (15), which leads up to a spring chamber (11) and is recessed in the valve shaft (18) and/or in a stepped wall (21) of a wall housing (2), the top (16) of a valve piston (10a) configured as the closing unit (10) is equipped with a sealing cone (17) made of a plastic material having high indentation hardness, and the inner bore (9) receiving the valve shaft (18) comprises a stepped wall (21) in the area of a sealing seat (12) for the sealing cone (17) and the wall slinger washer (33) is provided at the lower end (19) of the inner bore (9).

14. The pressure relief valve according to claim 6, characterized in that the pressure medium inlet (7) transitions into the annular channel (15), which leads up to a spring chamber (11) and is recessed in the valve shaft (18) and/or in a stepped wall (21) of a wall housing (2), the top (16) of a valve piston (10a) configured as the closing unit (10) is equipped with a sealing cone (17) made of a plastic material having high indentation hardness, and the inner bore (9) receiving the valve shaft (18) comprises a stepped wall (21) in the area of a sealing seat (12) for the sealing cone (17) and the wall slinger washer (33) is provided at the lower end (19) of the inner bore (9).

\* \* \* \* \*